(12) United States Patent
Murayama et al.

(10) Patent No.: US 8,782,469 B2
(45) Date of Patent: Jul. 15, 2014

(54) REQUEST PROCESSING SYSTEM PROVIDED WITH MULTI-CORE PROCESSOR

(75) Inventors: Shunji Murayama, Hiratsuka (JP); Nakaba Sata, Odawara (JP); Hiroji Shibuya, Odawara (JP); Toshiaki Terao, Odawara (JP); Mika Teranishi, Ninomiya (JP)

(73) Assignee: Hitachi, Ltd., Tokyo (JP)

(*) Notice: Subject to any disclaimer, the term of this patent is extended or adjusted under 35 U.S.C. 154(b) by 352 days.

(21) Appl. No.: 12/668,524

(22) PCT Filed: Sep. 1, 2009

(86) PCT No.: PCT/JP2009/004301
§ 371 (c)(1),
(2), (4) Date: Oct. 26, 2011

(87) PCT Pub. No.: WO2011/027382
PCT Pub. Date: Mar. 10, 2011

(65) Prior Publication Data
US 2012/0042215 A1    Feb. 16, 2012

(51) Int. Cl.
*G06F 11/00*    (2006.01)

(52) U.S. Cl.
USPC .......................................................... 714/36

(58) Field of Classification Search
USPC ................................................ 714/36, 48, 2
See application file for complete search history.

(56) References Cited

U.S. PATENT DOCUMENTS

| | | | |
|---|---|---|---|
| 2007/0011272 A1* | 1/2007 | Bakke et al. | 709/217 |
| 2008/0091972 A1* | 4/2008 | Tanaka et al. | 714/5 |
| 2008/0091974 A1 | 4/2008 | Nakashima | |
| 2008/0196043 A1* | 8/2008 | Feinleib et al. | 719/319 |
| 2009/0006890 A1 | 1/2009 | Takada | |

FOREIGN PATENT DOCUMENTS

JP  2008-123439  5/2008

OTHER PUBLICATIONS

H. Inoue, et al: "Vast: Virtualization-Assisted Concurrent Autonomous Self-Test" Test Conference, 2008. ITC 2008. IEEE International, IEEE, Piscataway, NJ, USA, Oct. 28, 2008, pp. 1-10, XP031372365, ISBN: 978-1-4244-2402-3.

* cited by examiner

*Primary Examiner* — Yair Leibovich
(74) *Attorney, Agent, or Firm* — Brundidge & Stanger, P.C.

(57) ABSTRACT

One processor core of a plurality of processor cores that are included in a multi-core processor that processes a request from an external device detects a prescribed event, specifies a sub resource that is assigned to the one processor core based on the resource management information that indicates a sub resource of a plurality of sub resources that are included in a physical resource and a processor core that is assigned to the sub resource, and executes a reboot based on the specified sub resource.

11 Claims, 11 Drawing Sheets

FIG.3

| DEVICE | APPLICATION | | CORE 0 | CORE 1 | CORE 2 | CORE 3 | COMMON |
|---|---|---|---|---|---|---|---|
| RAM | LOG AREA | | 0x1000 ~ 0x10FF | 0x1100 ~ 0x11FF | 0x1200 ~ 0x12FF | 0x1300 ~ 0x13FF | 0x1900 ~ 0x19FF |
| | EXTRACTION AREA | | 0xA000 ~ 0xAFFF | 0xB000 ~ 0xBFFF | 0xC000 ~ 0xCFFF | 0xD000 ~ 0xDFFF | — |
| | OS AREA | | 0x3000 ~ 0x30FF | 0x3100 ~ 0x31FF | 0x3200 ~ 0x32FF | 0x3300 ~ 0x33FF | — |
| | RAID AREA | | 0x2000 ~ 0x20FF | 0x2100 ~ 0x21FF | 0x2200 ~ 0x22FF | 0x23000 ~ 0x23FF | — |
| | COMMON AREA (MEMORY COMMUNICATION BETWEEN CORES AND I/O PROCESSING) | | — | — | — | — | 0x2000 ~ 0x2FFF |
| ROM | BIOS | | | | | | 0x0000~ 0x00FF |
| | BOOT LOADER | | | | | | 0x0000 ~ 0x01FF |
| | RESOURCE INFORMATION TABLE | | | | | | 0x0000 ~ 0x02FF |
| | BUILT-IN OS | | | | | | 0x0000 ~ 0x03FF |
| | RAID MANAGEMENT PROGRAM | Front | | | | | 0x0000 ~ 0x04FF |
| | | Backend | | | | | — |
| CHIP SET | INTERRUPT (NORMAL SYSTEM) | Front | INT 0 | INT 1 | INT 2 | INT 3 | — |
| | | Backend | — | — | — | — | — |
| | INTERRUPT (ABNORMAL SYSTEM) | | INT 4 | INT 5 | INT 6 | INT 7 | — |

| No. | ERROR SYMBOL | TEXT MESSAGE | CONTENTS | REBOOT TYPE |
|---|---|---|---|---|
| 1 | HJ14xx | Microprogram error [DMA] | LOGICAL CONTRADICTION OF MICRO PROGRAM HAS BEEN DETECTED (DATA TRANSFER CONTROL) | LV3 |
| 2 | HJ18xx | Microprogram error [DCR] | LOGICAL CONTRADICTION OF MICRO PROGRAM HAS BEEN DETECTED (DISK DRIVE RESTORATION) | LV3 |
| 3 | HJ1Dxx | Microprogram error [SVI] | LOGICAL CONTRADICTION OF MICRO PROGRAM HAS BEEN DETECTED (MANAGEMENT PC INTERFACE) | LV3 |
| 4 | HJ1Dxx | Microprogram error [SVI] | LOGICAL CONTRADICTION OF MICRO PROGRAM HAS BEEN DETECTED (RAID CONTROL) | LV3 |
| ⋮ | ⋮ | ⋮ | ⋮ | ⋮ |
| 101 | OS14xx | Operatingsystem error [LAN] | LOGICAL CONTRADICTION OF OPERATING SYSTEM HAS BEEN DETECTED (NETWORK CONTROL) | LV2 |
| 102 | OS18xx | Operatingsystem error [MEM] | LOGICAL CONTRADICTION OF OPERATING SYSTEM HAS BEEN DETECTED (MEMORY POOL CONTROL) | LV2 |
| 103 | OS1Dxx | Operatingsystem error [TSK] | LOGICAL CONTRADICTION OF OPERATING SYSTEM HAS BEEN DETECTED (TASK CONTROL) | LV2 |
| ⋮ | ⋮ | ⋮ | ⋮ | ⋮ |
| 201 | 1141Axy | HDU error over (Unit-x, HDU-y) [SCRV] | DISK AT A POSITION INDICATED BY XY EXCEEDS THRESHOLD VALUE DUE TO SCSI INTERFACE ERROR OF RECOVERED | LV1 |
| 202 | 1141Cxy | HDU error over (Unit-x, HDU-y)[ONVRCV] | DISK AT A POSITION INDICATED BY XY EXCEEDS THRESHOLD VALUE DUE TO COLLECTABLE ERROR OF ON-LINE VERIFY | LV1 |
| 203 | 1141xy | HDU error over (Unit-x, HDU-y) [REAOV] | THRESHOLD VALUE OF REASSIGN EXECUTION COUNT IS EXCEEDED | LV1 |
| ⋮ | ⋮ | ⋮ | ⋮ | ⋮ |

REQUEST PROCESSING SYSTEM PROVIDED WITH MULTI-CORE PROCESSOR

TECHNICAL FIELD

The present invention generally relates to a reboot in a system that processes a request from an external device.

BACKGROUND ART

A storage system is known for instance as a system that processes a request from an external device (a request processing system). In general, the storage system receives an I/O request (a write request or a read request), and processes the I/O request.

The processing of the I/O request is executed by a processor in the storage system most commonly. As a processor in the storage system, a single core multiprocessor is adopted for instance. The "single core multiprocessor" is a plurality of processors provided with a processor core. A "processor core" described in the present specification means an operation part in a processor.

On the other hand, a multi-core single processor is known as a processor (for instance, see Patent Literature 1). The "multi-core single processor" is a processor that includes a plurality of processor cores.

In other words, each of a plurality of processors is provided with one processor core for the single core multiprocessor, and one processor is provided with a plurality of processor cores for the multi-core single processor.

CITATION LIST

Patent Literature

PTL 1

Japanese Patent Application Laid-Open Publication No. 2008-123439

SUMMARY OF INVENTION

Technical Problem

For the storage system provided with a single core multiprocessor, in the case in which a computer program that has been stored into a memory (such as an application program) is exchanged, a hard reboot is executed for every processor. When a processor executes a hard reboot, another processor can processes an I/O request. Here, a "hard reboot" is a reboot that is executed in a hard reset processing. The hard reset processing is a processing that is executed in the case of a hard reset (in the case in which an electronic power supply of the processor is cut off and then restored). More specifically, the hard reset processing is a processing that is executed in the case in which a signal is input to a prescribed pin (a reset pin) in a plurality of pins mounted to a processor.

However, for the storage system provided with a multi-core single processor, it is not preferable to execute a hard reboot of the single processor. Because, all processor cores that are included in the single processor are rebooted, and any processor core in the single processor cannot process an I/O request, thereby stopping a service (I/O) to a host device.

The above problem is not restricted to the storage system, and may occur similarly for request processing systems of other kinds.

An object of the present invention is to provide a request processing system with a multi-core single processor in which a reboot can be executed without stopping a processing of a request from an external device.

Solution to Problem

One processor core of a plurality of processor cores that are included in a multi-core processor that processes a request from an external device detects a prescribed event and executes the following processes (a) and (b):
(a) specifying a sub resource that is assigned to the one processor core based on the resource management information that indicates a sub resource of a plurality of sub resources that are included in a physical resource and a processor core that is assigned to the sub resource; and
(b) executing a reboot based on the specified sub resource.

By the above configuration, one processor core can execute a reboot without rebooting another processor core in a processor that includes the core. More specifically, a reboot can be executed without stopping a processing of a request from an external device. In other words, a reboot in a core unit can be enabled.

As a request processing system, any system that processes a request from an external device (for instance, a server (such as a file server and a WEB server) or a storage system) can be adopted.

Any external device that exists outside the request processing system and that transmits a request (such as a command) can be adopted. As an external device, a client computer, a host device, and a storage system can be mentioned for instance.

As a processing of a request from an external device, a processing for storing data and a processing for providing data can be mentioned for instance.

The request processing system can be provided with a plurality of the above processors (multi-core single processors). In the case in which a prescribed event is generated when one processor core is processing a request from an external device, the one processor core can pass a processing of a request to at least one anther processor core in a processor that is provided with the processor core.

All processor cores of a plurality of processor cores can process a request from an external device. Alternatively, partial processor cores of the plurality of processor cores can be processor cores of an operation system that processes a request from an external device, and the other processor cores can be processor cores of a stand-by system.

A physical resource includes a storage resource. The physical resource can include physical devices of other kinds such as a chip set.

A prescribed event is an exchange of a computer program (such as an application program and an OS (an operating system)) that has been stored into a storage resource or is a detection of a fault.

BRIEF DESCRIPTION OF DRAWINGS

FIG. 3 shows a resource management table 203.

FIG. 4 shows a fault level judgment table 204.

BEST MODE FOR CARRYING OUT THE INVENTION

A storage system to which the request processing system in accordance with an embodiment of the present invention is applied will be described below in detail with reference to the drawings.

Figure 1:
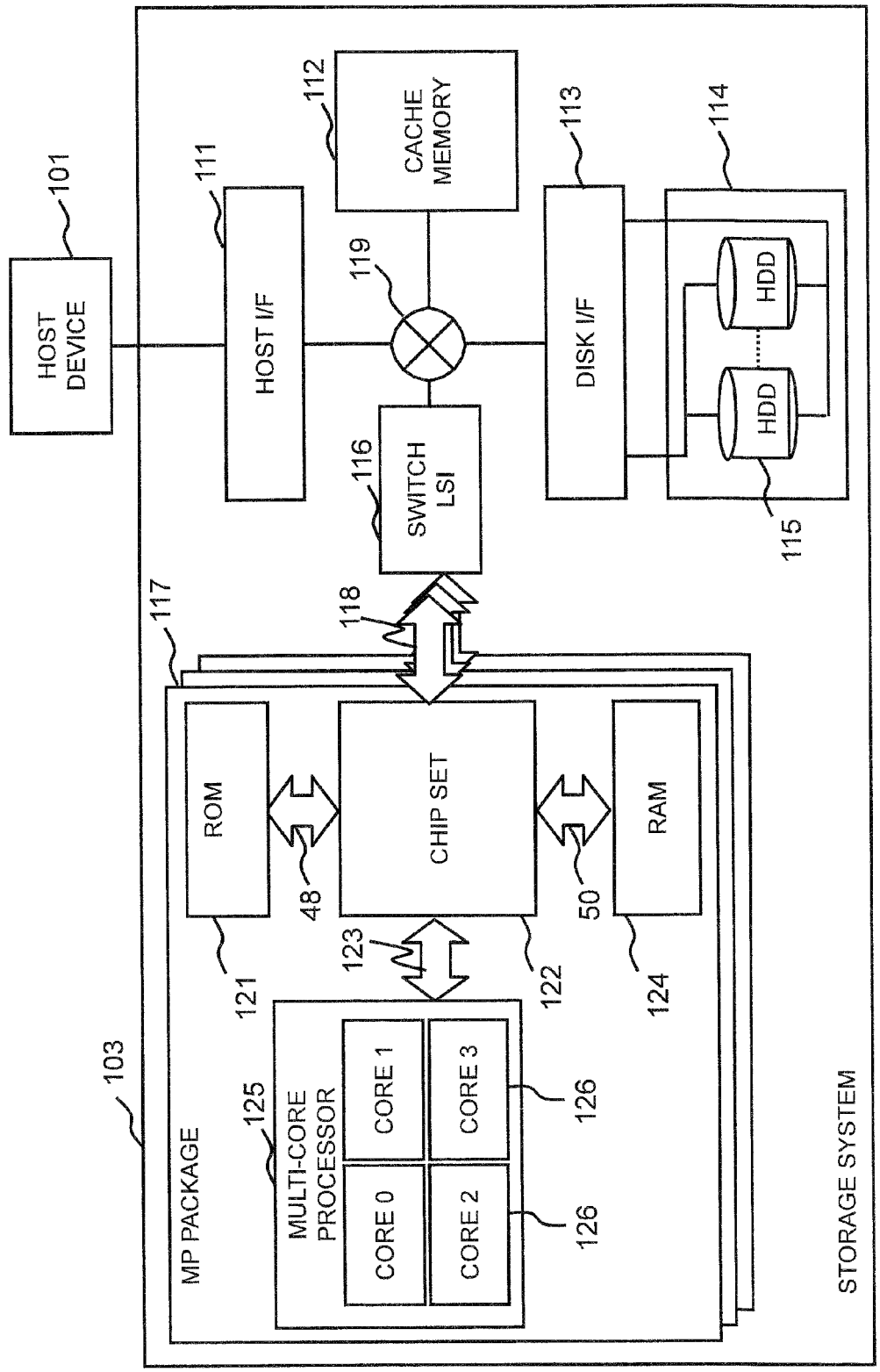
FIG. 1 shows a configuration of a storage system in accordance with an embodiment of the present invention.

FIG. 1 shows a configuration of a storage system in accordance with an embodiment of the present invention.

One or a plurality of host devices 101 is coupled to a storage system 103. The storage system 103 is composed of a host interface device (host I/F) 111, an internal network 119, a cache memory 112, a disk interface device (disk I/F) 113, an HDD (hard disk drive) group 114, a switch LSI (large scale integration) 116, and an MP (micro processor) package 117. The storage system 103 can be provided with a plurality of elements for at least one of elements 111, 119, 112, 113, 114, 116, and 117. FIG. 1 shows a plurality of MP packages 117 for instance. The HDD group 114 configures at least one RAID (redundant array of independent (or inexpensive) disks) group. Each RAID group is composed of at least two HDDs 115. Each HDD 115 is coupled to the disk I/F 113. At least one logical volume is formed based on the RAID group. As substitute for the HDD 115, a physical storage device of another kind such as a flash memory device provided with a flash memory chip can also be adopted.

The host I/F 111, the cache memory 112, the disk I/F 113, and the switch LSI 116 are coupled to each other via the internal network 119. The switch LSI 116 is coupled to the MP package 117 via an address/data signal line 118.

The host I/F 111 is an interface device that controls a communication with the host device 101. The host I/F 111 receives an I/O request (such as an I/O request of a file level or a block level) from the host device 101, and transmits the received I/O request to the MP package 117 via the internal network 119, the switch LSI 116, and the address/data signal line 118. In the case in which the host I/F 111 receives a processing result for the I/O request from the host device 101 from the MP package 117, the host I/F 111 transmits a response that includes the processing result to the host device 101.

The cache memory 112 temporarily stores data associated with a write request from the host device 101 (write target data) or data that has been read from the HDD group 114 according to a read request from the host device 101 (read target data).

The switch LSI 116 is an LSI that controls a communication between the MP package 117 and the host I/F 111, the cache memory 112, and the disk I/F 113. As substitute for an LSI, other means can implement a switch function.

The MP package 117 is provided with a multi-core processor (hereafter referred to as a processor) 125 and a physical resource. The physical resource includes a storage resource and a chip set 122 for instance. The storage resource includes a ROM (read only memory) 121 as a first memory and a RAM (random access memory) 124 as a second memory for instance. The processor 125 is coupled to the chip set 122 via a front side bus 123. The ROM 121 is coupled to the chip set 122 via a bus 48. The RAM 124 is coupled to the chip set 122 via a bus 50.

The processor 125 is a multi-core single processor. For an embodiment in accordance with the present invention, there is a plurality of MP packages 117 provided with a multi-core single processor.

The processor 125 is provided with a plurality of processor cores 126, for instance four processor cores 126. Hereafter, the four processor cores 126 are referred to as a core 0, a core 1, a core 2, and a core 3. The cores 0 to 3 are operation parts. For instance, the cores 0 to 3 analyze an I/O request from the host device 101, and access the HDD 115 according to the analysis result. The core 0 of the cores 0 to 3 is a core as a bootstrap processor (BSP), and the other cores 1 to 3 are cores as an application processor (AP). A hard reset of the processor 125 is executed in the specific case such as a debug (for instance, a signal is input to a reset pin of a plurality of pins that are included in the processor 125).

The ROM 121 stores a plurality of computer programs. The ROM 121 is a rewritable nonvolatile memory for instance, more specifically a flash memory.

The RAM 124 stores a computer program that is copied from the ROM 121.

The chip set 122 is an LSI set that manages a data passing among the processor 125, the ROM 121, and the RAM 124. The chip set 122 includes a memory controller that controls an access to the ROM 121 and the RAM 124, a bus interface (such as a PCI bus interface) that controls a data transfer, and an interrupt controller that controls an interrupt to the cores 0 to 3 for instance.

Figure 2:
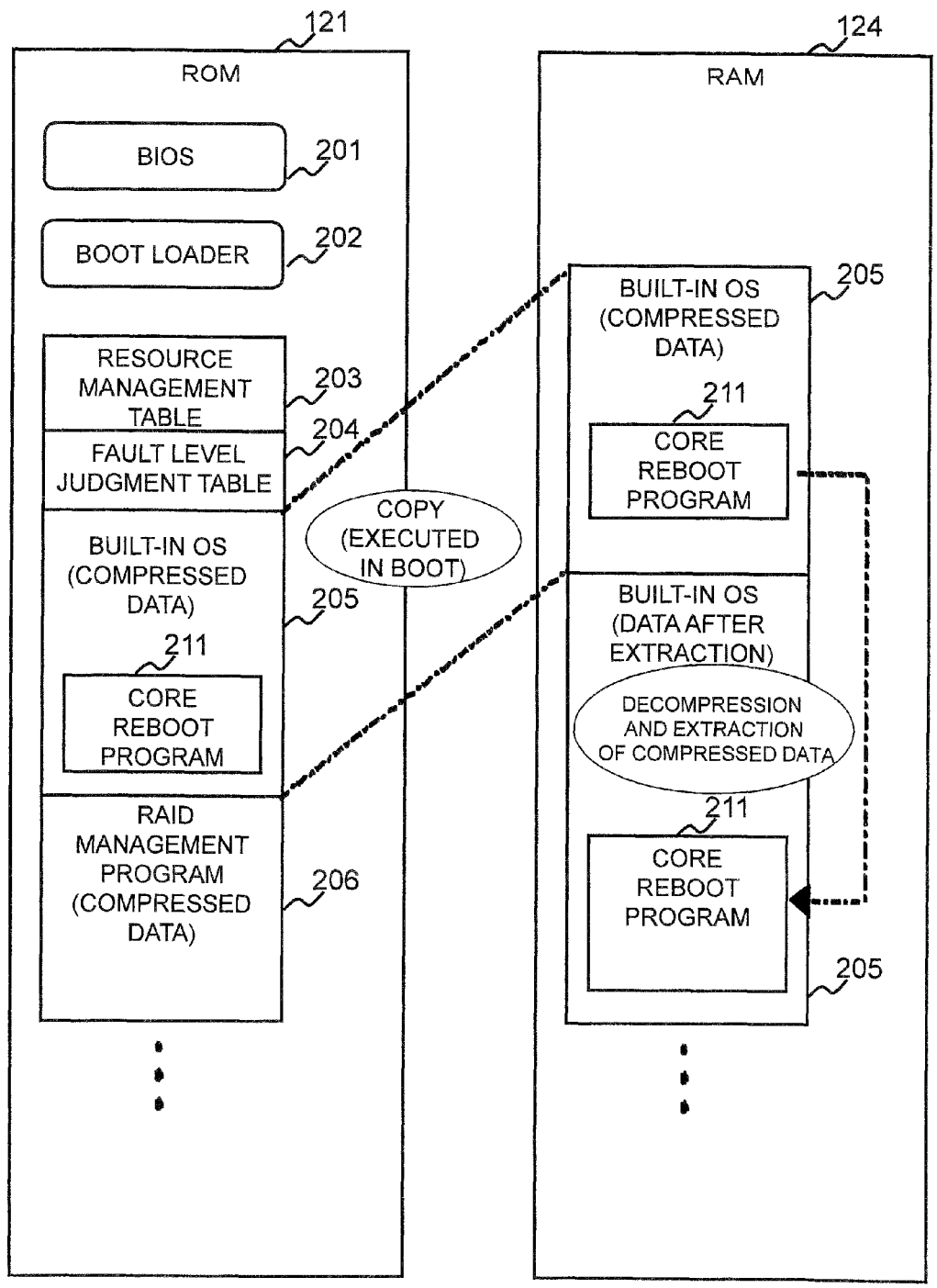
FIG. 2 shows a computer program that has been stored into a ROM 121 and a copy of a computer program to a RAM 124.

FIG. 2 shows a computer program that has been stored into a ROM 121 and a copy of a computer program to a RAM 124.

As a computer program that has been stored into a ROM 121, there can be mentioned for instance a BIOS (basic input/output system) 201, a boot loader 202, a built-in OS 205, and a RAID management program 206. The ROM 121 stores a resource management table 203 and a fault level judgment table 204. The information that has been stored into the ROM 121 is a table for an embodiment in accordance with the present invention. However, the information that is stored into the ROM 121 can also be a type other than a table.

The BIOS 201 initializes the RAM 124 and the processor 125, and reads the boot loader 202.

The boot loader 202 is a program that functions as an initial program loader for instance. The boot loader 202 copies the built-in OS 205 to the RAM 124 for an extraction.

The built-in OS 205 includes a core reboot program 211 and has been compressed. The built-in OS 205 is copied from the ROM 121 to the RAM 124 and is extracted by the boot loader 202. Consequently, a decompressed built-in OS 205 that includes the core reboot program 211 is generated in the RAM 124. The core reboot program 211 is called from the RAID management program 206 and executes a soft reset processing described later. In the soft reset processing, a reboot in a core unit is executed.

The RAID management program 206 is an example of an application program that operates on the built-in OS 205, and is stored into the ROM 121 after being compressed. The RAID management program 206 is copied from the ROM 121 to the RAM 124 and is extracted by the built-in OS 205. Consequently, a decompressed RAID management program 206 is generated in the RAM 124. The RAID management program 206 executes a processing of an I/O request (an I/O processing). More specifically, the I/O processing includes writing of the write target data associated with the I/O request to at least two HDDs 115 that configure a RAID group based on an access destination area that is specified by the I/O request (a write request or a read request), or reading of the read target data from at least two HDDs 115 that configure a RAID group based on a specified access destination area and providing the data to the host device 101 for instance. Here, the access destination area can be an area in a logical volume. In the case in which a logical volume is a volume that complies with Thin Provisioning, the access destination area can be a real area that is assigned to a virtual area in a logical volume (a storage area based on the RAID group).

The resource management table 203 and the fault level judgment table 204 will be described in the following.

FIG. 3 shows a resource management table 203.

The resource management table 203 indicates a sub resource of a plurality of sub resources that are included in a physical resource and a processor core 126 to which the sub resource is assigned. The physical resource includes the ROM 121, the RAM 124, and the chip set 122. A table 203 includes the information that indicates a part of the ROM 121, the RAM 124, and the chip set 122 which are assigned for the cores 0 to 3. In addition, the table 203 includes the information that indicates a part of the physical resource that is shared for the cores 0 to 3.

In the example of FIG. 3, the RAM 124 is provided with a log area, an extraction area, an OS area, and a RAID area for every core, and an area common for the cores 0 to 3. The log area is an area into which a log is stored. The RAM 124 is also provided with a log area common for the cores 0 to 3. The extraction area is an area of an extraction destination of the compressed data (the built-in OS 205 and the RAID management program 206). The OS area is an area of a copy destination of the built-in OS 205 (compressed data). The RAID area is an area of a copy destination of the RAID management program 206 (compressed data). The common area is used for passing and taking over of a communication between cores and an I/O processing.

Moreover, in the example of FIG. 3, the ROM 121 is not provided with an area for every core, and is shared for the cores 0 to 3.

Moreover, in the example of FIG. 3, the interrupt controller in the chip set is provided with an interrupt pin that is assigned for every core. More specifically, an interrupt pin INT0 is used for the core 0.

FIG. 4 shows a fault level judgment table 204.

The fault level judgment table 204 lists a fault level that is corresponded to a fault of each kind. As a fault level, there are three levels (LV1, LV2, and LV3) for instance. However, the number of levels can be larger or less than three. A fault of each kind is corresponded to any of the fault levels.

For the fault level, LV1 is severest and LV3 is lightest (more specifically, as the number of LV is smaller, the fault level is severer. Moreover, the table 204 of FIG. 4 lists an error symbol, a text message, and contents as the information related to a kind of a fault. All or a part of the information elements can be displayed in a detection of a fault. The information related to a kind of a fault is not restricted to the information elements, and other information elements can also be adopted.

A flow of the processing that is executed in an embodiment in accordance with the present invention will be described in the following. In the following descriptions, an area (an area in the RAM 124) corresponding to a core N (N is any of 0 to 3), which is specified by the resource management table 203, is referred to as "area N". For instance, a log area corresponding to a core 0 is referred to as "log area 0".

Figure 5:
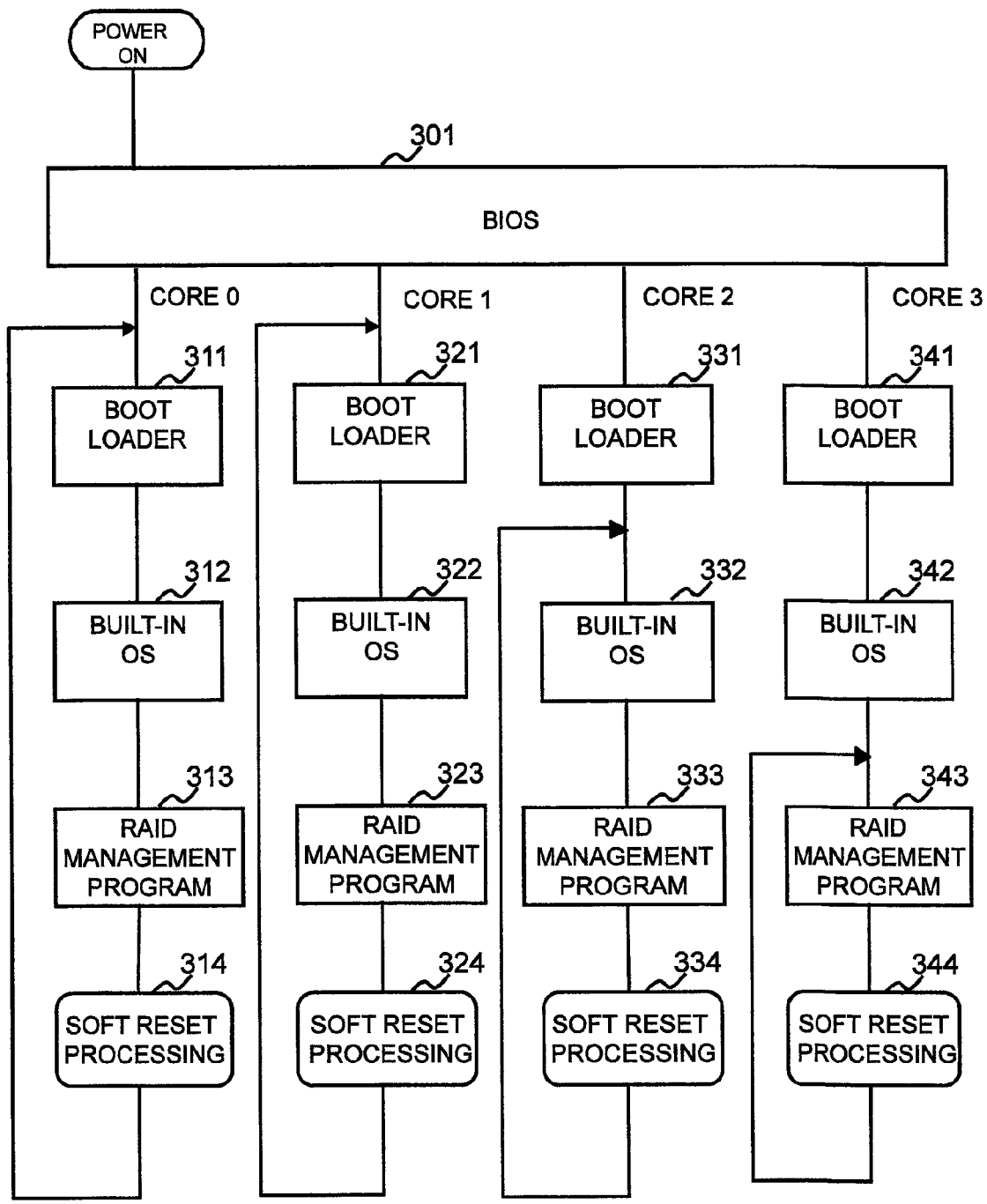
FIG. 5 shows an outline of a processing that is executed in an embodiment in accordance with the present invention.

FIG. 5 shows an outline of a processing that is executed in an embodiment in accordance with the present invention.

In the case in which the power supply of the processor 125 is turned on (for instance, in the case in which a hard reset of the processor 125 is executed), the cores 0 to 3 load a BIOS 201 from the ROM 121 and execute the BIOS 201 (step 301). For instance, an initialization of the RAM 124 and an initialization of the processor 125 are executed.

For each core, a boot loader 202, a built-in OS 205, and a RAID management program 206 are loaded in this order. An activation of the boot loader 202 can be executed for the cores 0 to 3 simultaneously or in order. For an embodiment in accordance with the present invention, the boot loader 202 is activated in the order of the core 0, the core 1, the core 2, and the core 3. The details will be described in the following.

The BIOS 201 of the core 0 loads the boot loader 202 from the ROM 121 to the RAM 124 and activates the boot loader 202. At this time, the BIOS 201 of the cores 1 to 3 waits the activation since the BIOS 201 of the cores 1 to 3 is under the condition that the BIOS 201 activates the boot loader 202 of the cores 1 to 3 in the case in which the BIOS 201 receives a command from a boot loader 202 of other cores (for instance, the core 0). For instance, in the case in which the boot loader 202 of the core 0 judges that the core 541 is normal, the boot loader 202 outputs a command for activating the core 1 to the core 1. Consequently, the boot loader 202 of the core 1 that has been in the wait state is activated.

Figure 6:
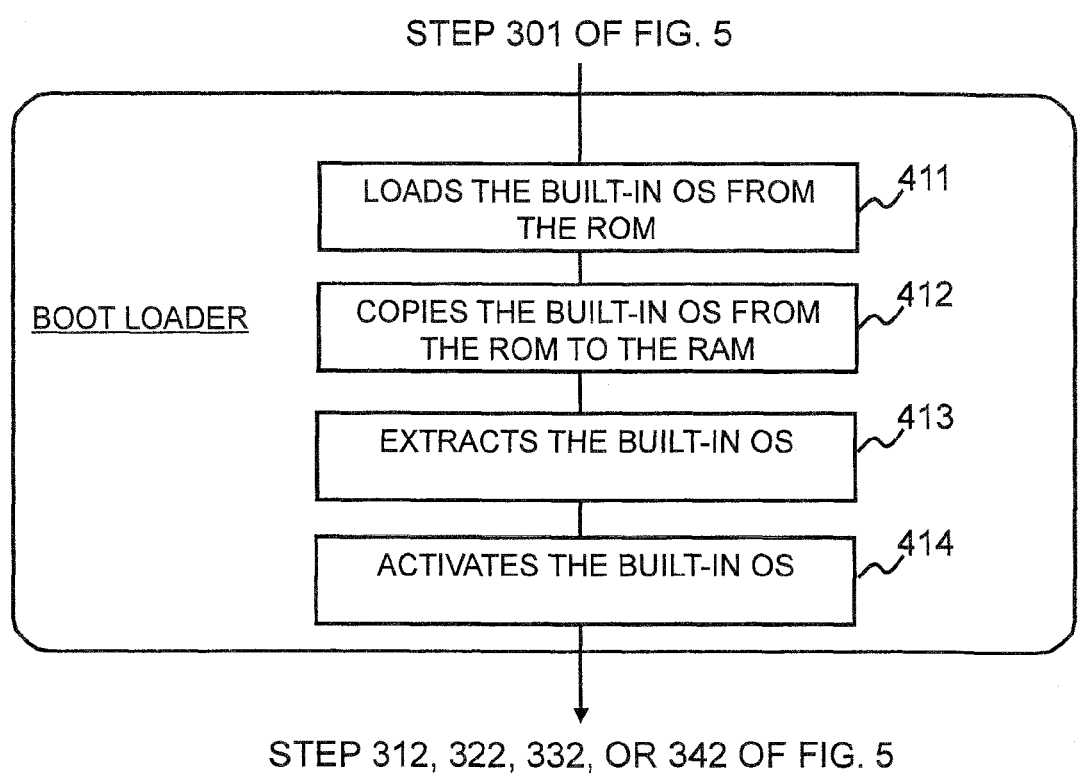
FIG. 6 shows the details of a step 311 (321, 331, or 341) of FIG. 5.

In the next place, a step 311 is executed. That is, the boot loader 202 of the core 0 refers to the resource management table 203 and specifies an OS area 0 and an extraction area 0. As shown in FIG. 6, the boot loader 202 of the core 0 then loads a built-in OS 205 from the ROM 121 (step 411), copies the built-in OS 205 from the ROM 121 to the OS area 0 in the RAM 124 (step 412), and extracts the built-in OS 205 in the OS area 0 for the extraction area 0 (step 413). Next, the boot loader 202 of the core 0 activates the built-in OS 205 in the extraction area 0 (step 414).

Figure 7:
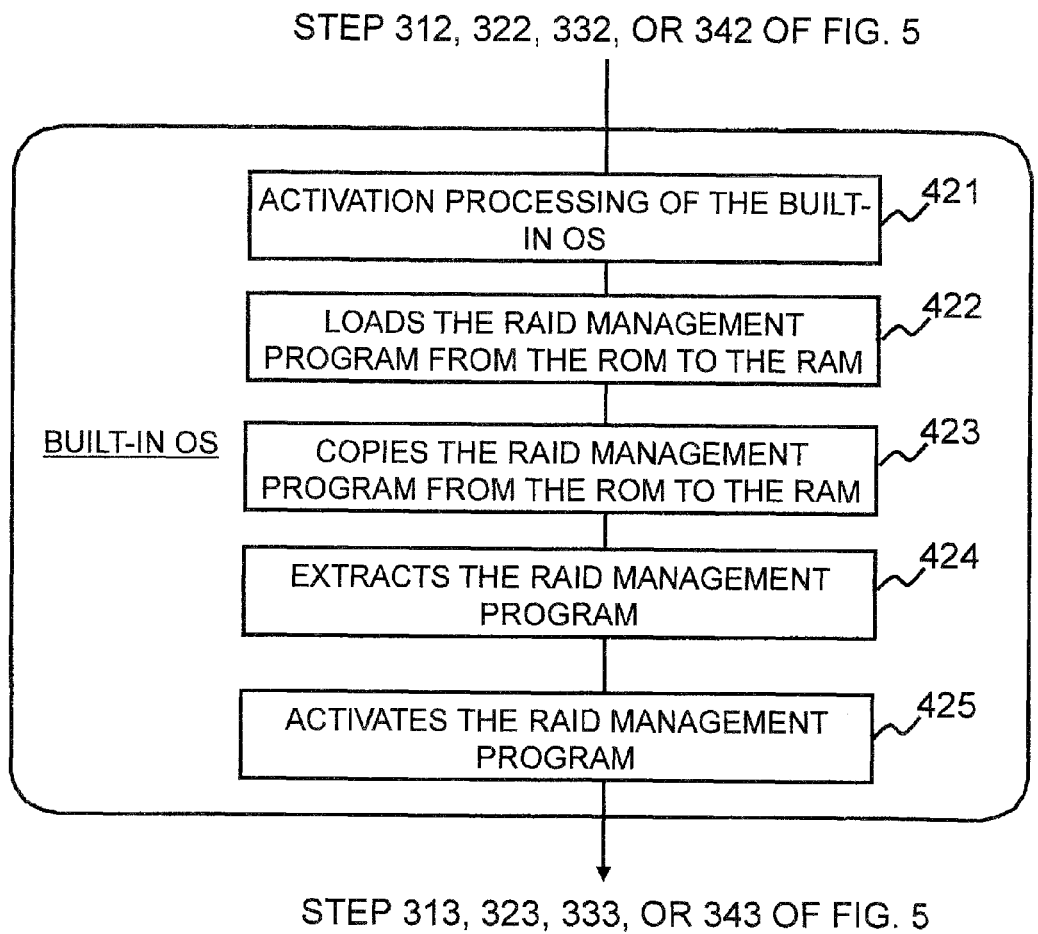
FIG. 7 shows the details of a step 312 (322, 332, or 342) of FIG. 5.

In the next place, a step 312 is executed. That is, as shown in FIG. 7, the built-in OS 205 of the core 0 executes an activation processing (step 421), refers to the resource management table 203, and specifies an extraction area 0. the built-in OS 205 of the core 0 loads the RAID management program 206 from the ROM 121 (step 422), copies the RAID management program 206 from the ROM 121 to the RAID area 0 in the RAM 124 (step 423), and extracts the RAID management program 206 in the RAID area 0 for the extraction area 0 (step 424). Next, the built-in OS 205 of the core 0 activates the RAID management program 206 in the extraction area 0 (step 425).

In the next place, a step 313 is executed. That is, the RAID management program 206 of the core 0 executes the processing that complies with the program 206. For instance, the RAID management program 206 of the core 0 executes the I/O processing that complies with an I/O request from the host device 101.

An example of the core 0 has been described. However, for the cores 1 to 3, the boot loader 202 is also activated by the BIOS 201 and the processing similar to the steps 311 to 313 is the executed (steps 321 to 323 for the core 1, steps 331 to 333 for the core 2, and steps 341 to 343 for the core 3).

In the case in which a prescribed event is generated for any of the cores 0 to 3, the core executes a soft reset processing (steps 314, 324, 334, and 344). An execution of a soft reset processing for one core does not cause an execution of a soft reset processing for other cores. In other words, the soft reset processing is a reset processing in a core unit and is different from a reset processing in a processor unit (a hard reset processing) that is executed in the case in which a hard reset is executed. More specifically, a reading from an initial address (for instance, a top address of an area that stores the BIOS 201) is executed sequentially for a hard reset processing, and a reading from an address other than the initial address is executed for a soft reset processing. Consequently, a reboot for a soft reset processing is started in the middle of the flow of a reboot for a hard reset processing.

As a cause of an execution of a soft reset processing, an exchange of the RAID management program 206 in the ROM 121 (or an exchange of the built-in OS 205) and a detection of a fault can be mentioned for instance.

In the case in which the RAID management program 206 is exchanged or a fault level that is corresponded to a kind of a fault that has been detected is highest (a fault level is LV1), a reboot for a soft reset processing is started with an initialization of hardware and a load of the boot loader 202 (steps 314 and 324).

However, in the case in which a fault level is second (a fault level is LV2), a reboot for a soft reset processing is started with an extraction and an activation of the built-in OS 205 (see the step 334). In the case in which a fault level is lowest (a fault level is LV3), a reboot for a soft reset processing is started with the unload and load of the RAID management program 206 (step 344). In other words, in the case in which a fault level is lower than the prescribed level (LV1 for the above example), the number of sub processing in a reboot for a soft reset processing can be less. Consequently, a time required for a reboot can be shorter, whereby a time when an I/O performance of the storage system 103 is degraded can be shorter. Moreover, as a fault level is lower, the number of sub processing in a reboot for a soft reset processing can be less (in other words, a time required for a reboot can be shorter).

Figure 8:
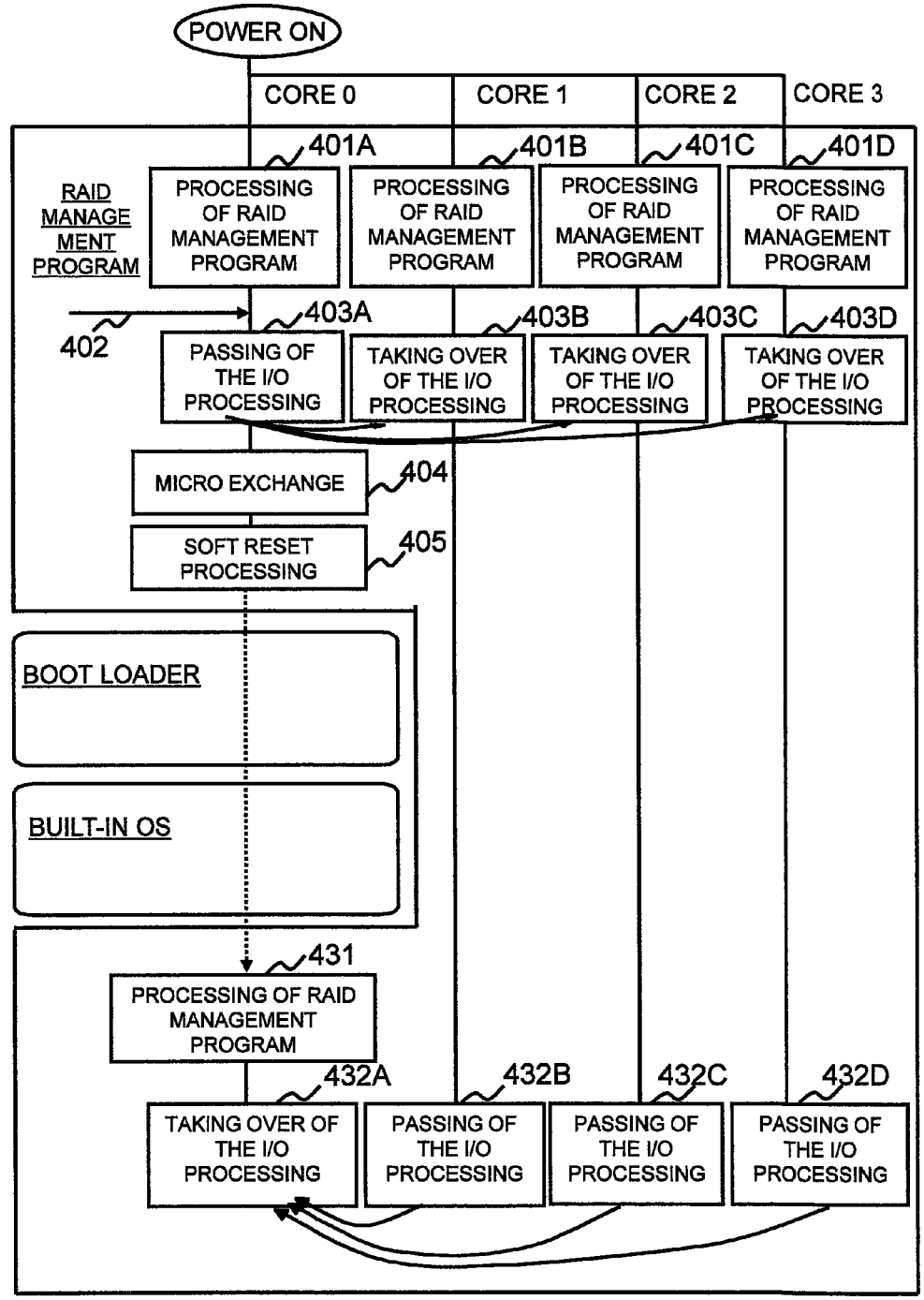
FIG. 8 shows a flow of a processing that is executed in the case in which a RAID management program 206 in the ROM 121 is exchanged.

FIG. 8 shows a flow of a processing that is executed in the case in which a RAID management program 206 in the ROM 121 is exchanged.

In the case in which the power supply of the processor 125 is turned on, the processing that has been described with reference to FIG. 5 is executed. As a result, the RAID management program 206 that is executed for each of the cores 0 to 3 executes a RAID management program processing (steps 401A to 401D). The RAID management program processing is a processing that complies with the RAID management program 206 that has been extracted in the RAM 124, for instance, an I/O processing (for instance, a wait for an I/O request, and an access to at least two HDDs 115 that complies with an access destination area that is specified by the I/O request.

For instance, a micro exchange signal that has been input from a management terminal (not shown) is received by the core 0 (step 402). The micro exchange signal is a signal that means an exchange of the RAID management program 206 (or the built-in OS 205).

The RAID management program 206 of the core 0 passes an I/O processing (for instance, the information that indicates a progress of an I/O processing and an access destination area) to the cores 1 to 3 (step 403A). In a different perspective, the cores 1 to 3 take over an I/O processing from the core 0 (steps 403B to 403D). More specifically, the RAID management program 206 of the core 0 stores the information related to an I/O processing into a common area (an area in the RAM 124) that is indicated by the resource management table 203. The RAID management program 206 of each of the cores 1 to 3 then uses the information in a common area to execute an I/O processing. The core 0 executes a soft reset processing later. However, since the cores 1 to 3 do not execute a soft reset processing, a reboot of the core 0 can be executed without stopping the I/O. The I/O processing can be passed to at least one other core (for instance, only the core 1) in the processor 125 provided with the core 0.

After the core 0 passes the I/O processing, the RAID management program 206 in the ROM 121 is replaced by another RAID management program (step 404).

After that, the core 0 executes a soft reset processing (step 405). More specifically, the RAID management program 206 of the core 0 calls the core reboot program 211 in the built-in OS 205, and the core 0 executes a processing that complies with the program 211. The soft reset processing will be described with reference to FIG. 10 later.

In the soft reset processing, a boot loader is activated. Consequently, the RAID management program 206 after the exchange is executed for the core 0 through the steps 311 and 312 shown in FIG. 5 (more specifically, the steps 411 to 414 shown in FIG. 6 and the steps 421 to 425 shown in FIG. 7). In other words, the RAID management program processing is executed (step 431). The I/O processing that has been passed to the cores 1 to 3 is then passed from the cores 1 to 3 to the core 0 (steps 432A to 432D).

Figure 9:
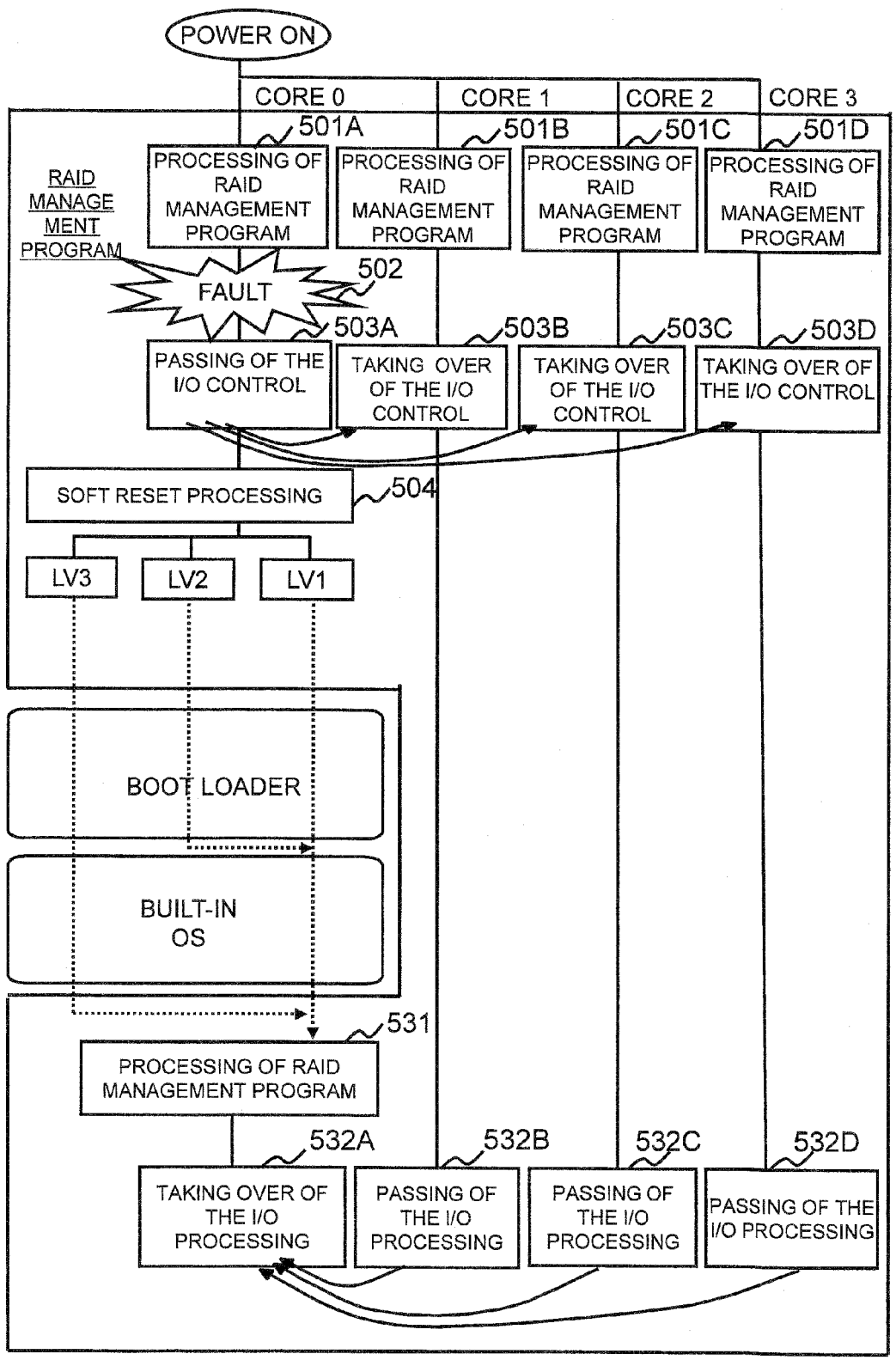
FIG. 9 shows a flow of a processing that is executed in the case in which a fault is detected.

FIG. 9 shows a flow of a processing that is executed in the case in which a fault is detected.

In the case in which the RAID management program 206 that is executed for each of the cores 0 to 3 executes a RAID management program processing (steps 501A to 501D), the RAID management program 206 of the core 0 detects a fault (step 502).

Figure 10:
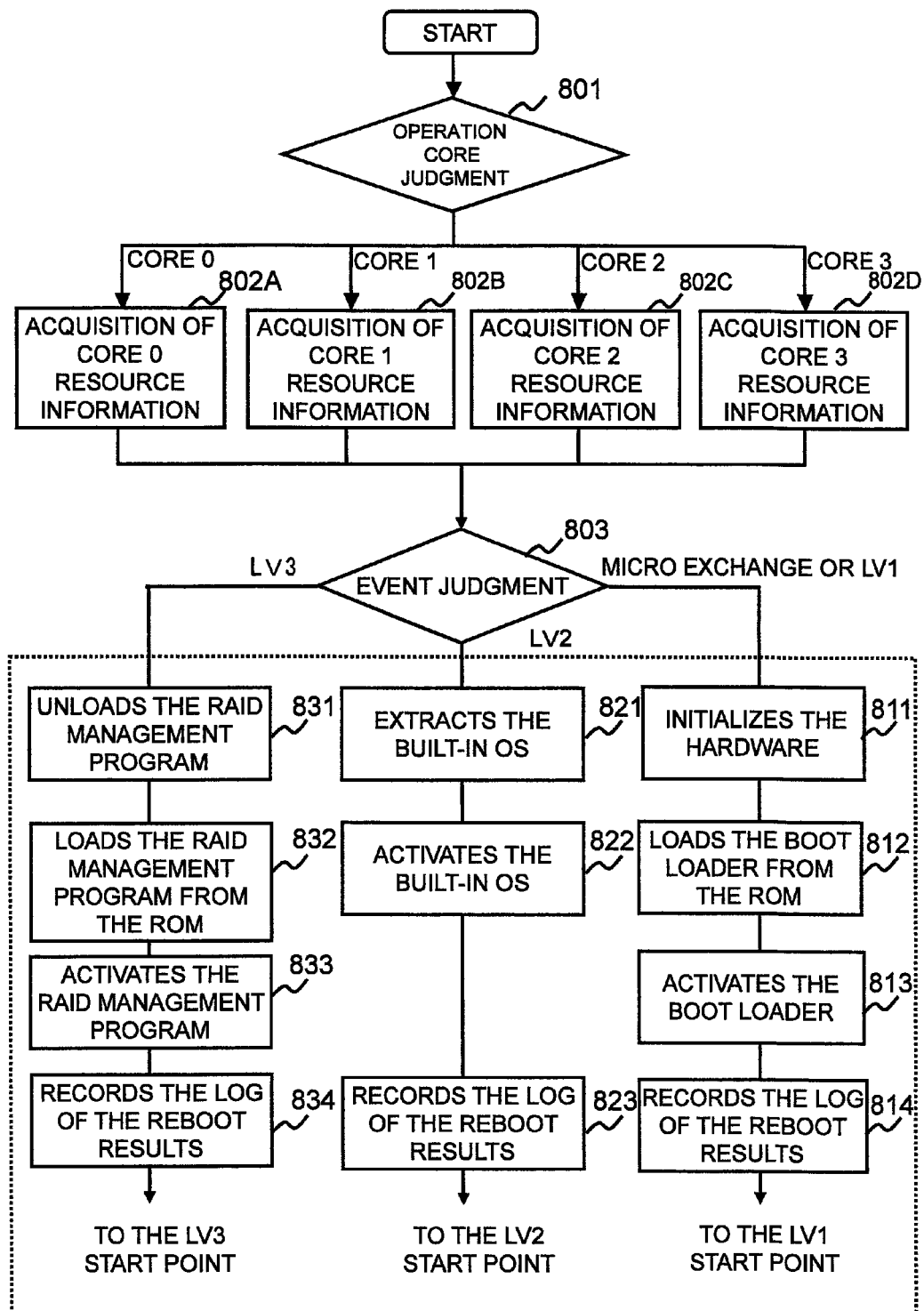
FIG. 10 shows a flow of a soft reset processing.

In this case, the RAID management program 206 of the core 0 passes an I/O processing to the cores 1 to 3 (step 503A), and calls the core reboot program 211 in the built-in OS 205 to executes a soft reset processing (see FIG. 10). The I/O processing can be passed to at least one other core (for instance, only the core 1) in the processor 125 provided with the core 0.

Unlike the case of a micro exchange, a reboot that is executed in the soft reset processing is different depending on a fault level corresponding to a kind of a fault that has been detected. More specifically, in the case in which a corresponding fault level is LV1, the processing is executed from the step 311 shown in FIG. 5. In the case in which a corresponding fault level is LV2, the processing is executed from the step 312 shown in FIG. 5. In the case in which a corresponding fault level is LV3, the processing is executed from the step 313 shown in FIG. 5. In other words, as a fault level is lower, a time required for a reboot can be shorter.

After that, the RAID management program processing is executed for the core 0 (step 531). The I/O processing that has been passed to the cores 1 to 3 is then passed from the cores 1 to 3 to the core 0 (steps 532A to 532D).

FIG. 10 shows a flow of a soft reset processing. The soft reset processing is executed by an execution of the core reboot program 211 in the built-in OS 205 by a core. The soft reset processing will be described in the following while the core reboot program 211 is a subject.

The core reboot program (referred to as a program in the descriptions of FIG. 10) 211 executes an operation core judgment (step 801). The operation core judgment is a judgment which of the cores 0 to 3 is a core that executes the program 211. Hereafter, a core that is judged here is referred to as a core T.

The program 211 acquires the information corresponding to the core T that has been judged in the step 801 (the information in a column corresponding to the core T and the information in a column corresponding commonly, hereafter referred to as the core T resource information) (step 802A, 802B, 802C, or 802D)

In the next place, the program 211 executes an event judgment (step 803). The event judgment is a judgment related to an event that has been a turning point of a soft reset processing. For the event judgment, the following (A) and (B) are judged more specifically:

(A) whether an event is a micro exchange or not; and
(B) in the case in which an event is not a micro exchange but a detection of a fault, whether a fault level that is corresponded to a kind of a fault that has been detected is any one of LV1 to LV3 or not.

In the case in which it is judged that an event is a micro exchange or a fault level LV1 in the step 803, the following processing is executed. The program 211 initializes the hardware that is specified by the core T resource information (for instance, a log area T, an extraction area T, an OS area T, and a RAID area T) (step 811). The program 211 then loads a boot loader 202 from the ROM 121 and activates the boot loader 202 (steps 812 and 813). The program 211 prepares a log that indicates the reboot results, and stores the prepared log into the log area T. After that, the step 311 (or any one of steps 321, 331, and 341) shown in FIG. 5 is executed.

In the case in which it is judged that an event is a fault level LV2 in the step 803, the following processing is executed. The program 211 extracts the built-in OS 205 in the extraction area T that is specified by the core T resource information (step 821). Here, for instance, the built-in OS 205 (compressed data) that exists in the OS area T is extracted (the built-in OS 205 can also be copied from the ROM 121 to the OS area T). The program 211 then activates the built-in OS 205 in the extraction area T (step 822). The program 211 prepares a log that indicates the reboot results, and stores the prepared log into the log area T. After that, the step 312 (or any one of steps 322, 332, and 342) shown in FIG. 5 is executed.

In the case in which it is judged that an event is a fault level LV3 in the step 803, the following processing is executed. The program 211 unloads the RAID management program 206 from the extraction area T and the RAID area T that are specified by the core T resource information (step 831). The program 211 then loads the RAID management program 206 from the ROM 121 (step 832). The program 211 extracts the RAID management program 206 from the RAID area T for the extraction area T, and activates the RAID management program 206 in the extraction area T (step 833). The program 211 prepares a log that indicates the reboot results, and stores the prepared log into the log area T. After that, the step 313 (or any one of steps 323, 333, and 343) shown in FIG. 5 is executed.

As described above, by an embodiment in accordance with the present invention, a reboot in a core unit can be enabled. Consequently, in the case in which one core 0 is rebooted, even when an I/O processing is passed to any other core in the processor 125 provided with a core 0, the other core is not rebooted with a reboot of a core 0 as a turning point. Accordingly, a reboot of the core 0 can be enabled without stopping an I/O.

Moreover, by an embodiment in accordance with the present invention, in the case in which a fault level is lower than LV1, a reboot can be completed for a shorter time as compared with the case of a micro exchange or a fault level LV1.

The soft reset processing is executed by the core reboot program 211. By the descriptions of FIG. 10, the core reboot program 211 is provided with a part of the functions of the BIOS 201, the boot loader 202, and the built-in OS 205. More specifically, the program 211 is provided with a loading and an activation of the boot loader 202, an activation of the built-in OS 205, and a loading and an activation of the RAID management program 206.

Figure 11:
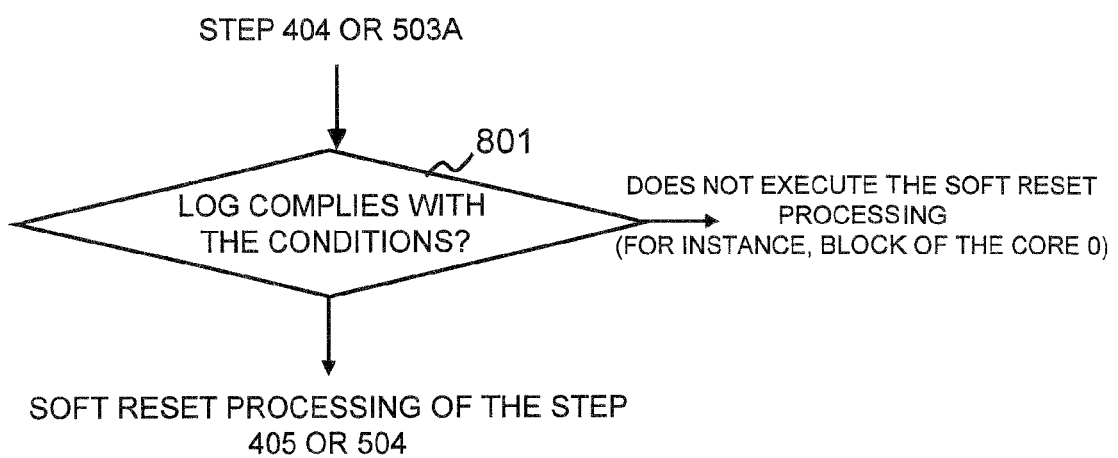
FIG. 11 is an explanation chart of a processing that is executed in a modified example of an embodiment of the present invention.

While a preferred embodiment in accordance with the present invention have been described above, the present invention is not restricted to the embodiment, and various changes, modifications, and functional additions can be thus made without departing from the scope of the present invention. For instance, as shown in FIG. 11, the core reboot program 211 that is executed by the core T (such as a core 0) can also judge whether or not a log that has been stored in the log area T complies with the prescribed conditions (for instance, whether or not the number of occurrence of a fault that is specified based on the log exceeds the prescribed threshold value) before the steps 405 and 504. In the case in which the result of the judgment is negative, the program 211 executes a soft reset processing. In the case in which the result of the judgment is positive, it is possible that the program 211 does not execute a soft reset processing.

REFERENCE SIGNS LIST

103: Storage system

The invention claimed is:

1. A request processing system, comprising:
a first interface device that receives a request from an external device;
a physical resource that includes a plurality of storage resources;
a multi-core processor that is coupled to the first interface device and the physical resource;
at least one RAID (Redundant Array of Independent or Inexpensive Disks) group comprising a plurality of physical storage devices; and
a second interface device that communicates with the plurality of physical storage devices,
wherein the physical resource includes a plurality of sub resources,
wherein the multi-core processor includes a plurality of processor cores,
wherein the plurality of sub resources are assigned to the plurality of processor cores,
wherein each of the plurality of storage resources stores resource management information that indicates a processor core and a sub resource that is assigned to the processor core, and
wherein when a prescribed event is generated, one processor core of the plurality of processor cores:
(a) specifies a sub resource that is assigned to the one processor core based on the resource management information; and
(b) executes a reboot based on the specified sub resource,
Wherein one RAID group comprises at least two physical storage devices;
Wherein the multi-core processor is coupled to the second interface device,
Wherein the storage resource includes a first memory and a second memory,
Wherein the first memory stores the resource management information, a BIOS (basic input/output system), a boot loader, an OS (operating system), and an application program that runs on the OS,
Wherein the second memory includes a plurality of sub memory areas that are assigned to the plurality of processor cores, Wherein each of the sub memory areas includes an OS area that is a sub memory area for an OS and an AP (application program) area that is a sub memory area for an application program, Wherein when a power supply of the multi-core processor is turned on, each processor core executes:

(H1) loading the BIOS from the first memory;

(H2) by executing the BIOS, loading the boot loader from the first memory and activating the boot loader;

(H3) by executing the boot loader, copying the OS from the first memory to an OS area that is assigned to the processor core and that is indicated by the resource management information and activating the OS;

(H4) by executing the OS, copying the application program from the first memory to an AP area that is assigned to the processor core and that is indicated by the resource management information and activating the application program; and (H5) executing the application program, Wherein the one processor core executes an I/O (input/output) processing by executing the application program, Wherein the I/O processing includes writing of the write target data associated with the request to at least two physical storage devices that configure a RAID group based on an access destination area that is specified by the request, or reading of the read target data from at least two physical storage devices that configure a RAID group based on a specified access destination area and providing the data to the external device, Wherein when the I/O processing is executed when the prescribed event is generated, the one processor core passes the I/O processing to at least one other multi-core processor of the plurality of processor cores, and then executes the reset processing, and wherein the one processor core executes any one of the following steps (x) to (z) for the step (b):

(x) initializing a sub memory area that is assigned to the one processor core, loading the boot loader from the first memory, and activating the boot loader, thereby executing the step (H3) and subsequent steps;

(y) activating the OS in the OS area that is assigned to the one processor core, thereby executing the step (H4) and subsequent steps; and (z) unloading the application in the AP area that is assigned to the one processor core, copies the application program from the first memory to the AP area that is assigned to the one processor core, and activating the application program, thereby executing the step (H5).

2. A request processing system according to claim 1, wherein a first fault level corresponds to the step (x), a second fault level corresponds to the step (y), and a third fault level corresponds to the step (z), wherein the first memory stores the fault level judgment information that indicates a kind of a fault and a fault level of the first to third fault levels to which the fault corresponds, wherein the prescribed event is a detection of a fault, and wherein the one processor core executes a processing corresponding to a fault level that is indicated by the fault level judgment information and that corresponds to a kind of the detected fault in the steps (x) to (z).

3. A request processing system according to claim 2, wherein each of the sub memory areas includes a log area that is a sub memory area for a log, wherein the one processor core writes a log that indicates the reboot result to a log area that is assigned to the one processor core in the step (b), and wherein the one processor core does not execute the steps (a) and (b) when at least one log that has been stored in the log area that is assigned to the one processor core complies with the prescribed conditions even if the prescribed event is generated.

4. The request processing system according to claim 1, wherein the prescribed event is an exchange of an OS and/or an application program that has been stored into the first memory, and wherein the step (x) is executed in the step (b).

5. A request processing system, comprising:

a first interface device that receives a request from an external device;

a physical resource that includes a plurality of storage resources; and a multi-core processor that is coupled to the first interface device and the physical resource, wherein the physical resource includes a plurality of sub resources, wherein the multi-core processor includes a plurality of processor cores, wherein the plurality of sub resources are assigned to the plurality of processor cores, wherein each of the plurality of storage resources stores resource management information that indicates a processor core and a sub resource that is assigned to the processor core, and wherein when a prescribed event is generated, one processor core of the plurality of processor cores:

(a) specifies a sub resource that is assigned to the one processor core based on the resource management information; and (b) executes a reboot based on the specified sub resource, wherein: there are a plurality of reboot processings corresponding to a plurality of reboot levels, wherein each of the reboot processing includes at least one sub processing, as the reboot level is higher, the number of sub processing included in the reboot processing is larger, and wherein the one processor core executes the reboot processing that corresponds to the reboot level corresponding to the generated event in the step (b).

6. A request processing system according to claim 5, wherein the prescribed event is a detection of a fault, wherein any one of the plurality of fault levels corresponds to a fault of each kind, wherein the reboot level is the fault level, and wherein the one processor core executes the reboot processing that is corresponds to the fault level corresponding to a kind of the detected fault in the step (b).

7. The request processing system according to claim 5, wherein the storage resource includes a first memory and a second memory, wherein the first memory stores a BIOS (basic input/output system), a boot loader, OS (operating system), and an application program, wherein the second memory includes a plurality of sub memory areas that are assigned to the plurality of processor cores, wherein when a power supply of the multi-core processor is turned on, each processor core executes:

wherein (H1) loading the BIOS from the first memory;

(H2) by executing the BIOS, loading the boot loader from the first memory and activating the boot loader;

(H3) by executing the boot loader, copying the OS from the first memory to a sub memory area that is assigned to the processor core and that is indicated by the resource management information and activating the OS;

(H4) by executing the OS, copying the application program from the first memory to a sub memory area that is assigned to the processor core and that is indicated by the resource management information and activating the application program; and (H5) executing the application program, wherein the one processor core executes any one of the following steps (x) to (z) for the step (b):

(x) initializing a sub memory area that is assigned to the one processor core, loading the boot loader from the first memory, and activating the boot loader, thereby executing the step (H3) and subsequent steps;

(y) activating the OS that has been loaded to the OS area that is assigned to the one processor core, thereby executing the step (H4) and subsequent steps; and (z) unloading the application in the AP area that is assigned to the one processor core, copies the application program from the first memory to the AP area that is assigned to the one processor core, and activating the application program, thereby executing the step (H5), wherein the plurality of reboot levels include a first reboot level to a third reboot level, and wherein the first reboot level corresponds to the step (x), the second reboot level corresponds to the step (y), and the third reboot level corresponds to the step (z).

8. The request processing system according to claim 1, wherein the storage resource includes a first memory and a second memory, wherein the first memory stores a BIOS (basic input/output system), a boot loader, OS (operating system), and an application program, wherein the second memory includes a plurality of sub memory areas that are assigned to the plurality of processor cores, wherein when a power supply of the multi-core processor is turned on, each processor core activates the BIOS, the boot loader, the OS, and the application program in this order, wherein the prescribed event is an exchange of an OS and/or an application program that has been stored into the first memory, and wherein the one processor core initializes a sub memory area that is assigned to the one processor core, loads the boot loader from the first memory, and activates the boot loader in the step (b).

9. A request processing system according to claim 8, wherein the prescribed event is a detection of a fault, and wherein when a fault level that is corresponds to a kind of a fault that has been detected is lower than the prescribed fault level, the one processor core executes a reboot processing having sub processing less than that included in a reboot processing that is executed when an OS and/or an application program that has been stored into the first memory is exchanged in the step (b).

10. A request processing system, comprising:

a first interface device that receives a request from an external device;

a physical resource that includes a plurality of storage resources; and a multi-core processor that is coupled to the first interface device and the physical resource, wherein the physical resource includes a plurality of sub resources, wherein the multi-core processor includes a plurality of processor cores, wherein the plurality of sub resources are assigned to the plurality of processor cores, wherein each of the plurality of storage resources stores resource management information that indicates a processor core and a sub resource that is assigned to the processor core, and wherein when a prescribed event is generated, one processor core of the plurality of processor cores:

(a) specifies a sub resource that is assigned to the one processor core based on the resource management information; and (b) executes a reboot based on the specified sub resource, wherein: the one processor core prepares a log that indicates the result of the reboot of the step (b) and stores the log into the storage resource when the step (b) is executed, and wherein the one processor core does not execute the steps (a) and (b) when the log that has been stored in the storage resource complies with the prescribed conditions even if the prescribed event is generated.

11. The request processing system according to claim 1, wherein when the processing of a request from the external device is executed when the prescribed event is generated, the one processor core passes the processing of the request to at least one other multi-core processor of the plurality of processor cores, and then executes the steps (a) and (b).

* * * * *

UNITED STATES PATENT AND TRADEMARK OFFICE
CERTIFICATE OF CORRECTION

PATENT NO. : 8,782,469 B2
APPLICATION NO. : 12/668524
DATED : July 15, 2014
INVENTOR(S) : S. Murayama et al.

Page 1 of 1

It is certified that error appears in the above-identified patent and that said Letters Patent is hereby corrected as shown below:

Title Page, should read,

-- (75) Inventors: Shunji Murayama, Hiratsuka (JP); Nakaba Sato, Odawara (JP); Hiroji Shibuya, Odawara (JP); Toshiaki Terao, Odawara (JP); Mika Teranishi, Ninomiya (JP) --

Signed and Sealed this
Seventh Day of October, 2014

Michelle K. Lee
*Deputy Director of the United States Patent and Trademark Office*